(12) United States Patent
Badr

(10) Patent No.: US 12,407,685 B2
(45) Date of Patent: Sep. 2, 2025

(54) DECENTRALIZED IDENTITY MANAGEMENT FOR WEB3

(71) Applicant: Google LLC, Mountain View, CA (US)

(72) Inventor: Ibrahim Badr, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 303 days.

(21) Appl. No.: 18/076,651

(22) Filed: Dec. 7, 2022

(65) Prior Publication Data

US 2024/0056441 A1    Feb. 15, 2024

Related U.S. Application Data

(60) Provisional application No. 63/396,649, filed on Aug. 10, 2022.

(51) Int. Cl.
H04L 9/40 (2022.01)

(52) U.S. Cl.
CPC ........ H04L 63/0861 (2013.01); H04L 63/102 (2013.01)

(58) Field of Classification Search
CPC . H04L 63/0861; H04L 63/102; H04L 9/3231; H04L 63/10; G06F 16/27; G06F 21/32
See application file for complete search history.

(56) References Cited

U.S. PATENT DOCUMENTS 11,490,260 B1 * 11/2022 Shoemaker ........... H04W 48/18
11,936,788 B1 *  3/2024 Shipley ............... G06F 21/6254
2020/0389309 A1 * 12/2020 Ricotta .................... H04L 9/32
2021/0056095 A1 *  2/2021 Srivastava .......... G06F 16/2379
2021/0209077 A1 *  7/2021 Snellman ............. G06F 16/219
2022/0230759 A1 *  7/2022 Abu El Ata ........... G16H 10/60
2022/0310207 A1 *  9/2022 Lacaze .................... G16B 40/00
2023/0268040 A1 *  8/2023 Cordonnier ............ G16H 10/60
                                                                705/3
2023/0421570 A1 * 12/2023 Gould ................... H04L 63/123
2024/0031340 A1 *  1/2024 Sahani ................ H04L 63/0421
2024/0039721 A1 *  2/2024 Young ....................... H04L 9/50

OTHER PUBLICATIONS

Mohamed Younis et al. "Blockchain-Enabled and Data0Driven Smart Healthcare Solution for Secure and Privacy-Preserving Data Access," 2022, p. 3746-3757 (Year: 2022).*
Morteza Alizadeh, Comparative Analysis Od Decentralized Identity Approaches, 2022, pp. 92273-92283 (Year: 2022).*

* cited by examiner

*Primary Examiner* — Luu T Pham
*Assistant Examiner* — Canh Le
(74) *Attorney, Agent, or Firm* — DORITY & MANNING, P.A.

(57) ABSTRACT

Systems and methods for identity management can leverage a blockchain to securely store and access personal data. Third party computing systems can request access to the personal data to obtain biometric data, medical history data, and/or other biological data associated with the user. The systems and methods can determine whether to provide access to the data and can generate log data to be logged in a view log based on the access provided.

20 Claims, 12 Drawing Sheets

600

602 — RECEIVE AN ACCESS REQUEST FROM A THIRD PARTY COMPUTING SYSTEM

604 — DETERMINE A PARTICULAR ENTITY ASSOCIATED WITH THE THIRD PARTY COMPUTING SYSTEM

606 — TRANSMIT A NOTIFICATION TO A PARTICULAR USER COMPUTING SYSTEM

608 — RECEIVE USER INPUT DATA FROM A PARTICULAR USER COMPUTING SYSTEM

610 — DETERMINE AN ACCESS ACTION BASED ON THE USER INPUT DATA

612 — ADJUST A VIEW LOG BASED ON THE ACCESS ACTION

Figure 6

DECENTRALIZED IDENTITY MANAGEMENT FOR WEB3

RELATED APPLICATIONS

This application claims priority to and the benefit of U.S. Provisional Patent Application No. 63/396,649, filed Aug. 10, 2022. U.S. Provisional Patent Application No. 63/396,649 is hereby incorporated by reference in its entirety.

FIELD

The present disclosure relates generally to the authorization of access to personal data associated with a user. More particularly, the present disclosure relates to leveraging the data security of a blockchain for providing a secure database for personal data such as biological data for the particular user that can be accessed by different third parties and a view log can be generated to track viewers.

BACKGROUND

A plurality of different third parties associated with a plurality of different third parties may request user data from a user. The different third parties can include medical service providers, biometric security companies, and insurance companies. Additionally, the plurality of different third parties can collect and aggregate their own user-specific data for each of their plurality of users. The third party specific collection and aggregation can lead to a user having their personal information stored in a plurality of different databases that the user may not be able to control.

Therefore, the user may be repetitively providing the same or similar data to a plurality of third parties. The third parties can then replicate and/or alter the data in a plurality of different ways without notice to the user. Additionally, the user may have limited control over the deletion of the data. Even for the third parties that do provide an accessible deletion feature, the user data may be stored by a plurality of third parties, which can make the deletion task tedious and, in some instances, impractical.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include one or more processors and one or more non-transitory computer-readable media that collectively store instructions that, when executed by the one or more processors, cause the computing system to perform operations. The operations can include receiving an access request from a third party computing system. The access request can be descriptive of a request to access biological data for a particular user. The biological data can be stored on a blockchain. In some implementations, the biological data can be associated with biological characteristics of the particular user. The operations can include determining a particular entity associated with the third party computing system. The operations can include transmitting a notification to a particular user computing system. The particular user computing system can be associated with the particular user. In some implementations, the notification can be descriptive of the access request and the particular entity. The operations can include receiving user input data from a particular user computing system. The user input data can be descriptive of a user response to the access request. The operations can include determining an access action based on the user input data. The access action can be descriptive of a level of access to be provided to the third party computing system to the biological data on the blockchain. The operations can include adjusting a view log based on the access action. The view log can be descriptive of one or more viewers associated with the biological data.

Another example aspect of the present disclosure is directed to a computer-implemented method. The method can include receiving, by a computing system including one or more processors, an access request from a third party computing system. The access request can be descriptive of a request to access personal data associated with a particular user. The personal data can be stored on a blockchain. In some implementations, the personal data can include biometric data associated with the particular user. The method can include determining, by the computing system, a particular entity associated with the third party computing system. The particular entity can be associated with a third party service provider. The method can include determining, by the computing system, an access action based on whether the particular entity is associated with one or more authorized entities. The one or more authorized entities can be determined based on one or more user inputs. The method can include adjusting, by the computing system, a view log associated with the personal data based on the access action. In some implementations, adjusting the view log can include adding log data associated with the particular entity and the access request to the view log. The method can include providing, by the computing system, blockchain data associated with the particular user. The blockchain data can include the personal data.

Another example aspect of the present disclosure is directed to one or more non-transitory computer-readable media that collectively store instructions that, when executed by one or more computing devices, cause the one or more computing devices to perform operations. The operations can include providing personal data to a third party computing system. The personal data can be associated with a particular user. In some implementations, the personal data can be stored on a blockchain. The operations can include determining a particular entity associated with the third party computing system. The particular entity can be associated with one or more web identifiers. The operations can include determining a view time associated with the third party computing system having access to the personal data. The operations can include generating log data based on the particular entity and the view time. The log data can be descriptive of the one or more web identifiers and the view time. The operations can include storing the log data in association with the personal data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a flow chart diagram of an example method to perform user data access authorization according to example embodiments of the present disclosure.

Figure 1A:
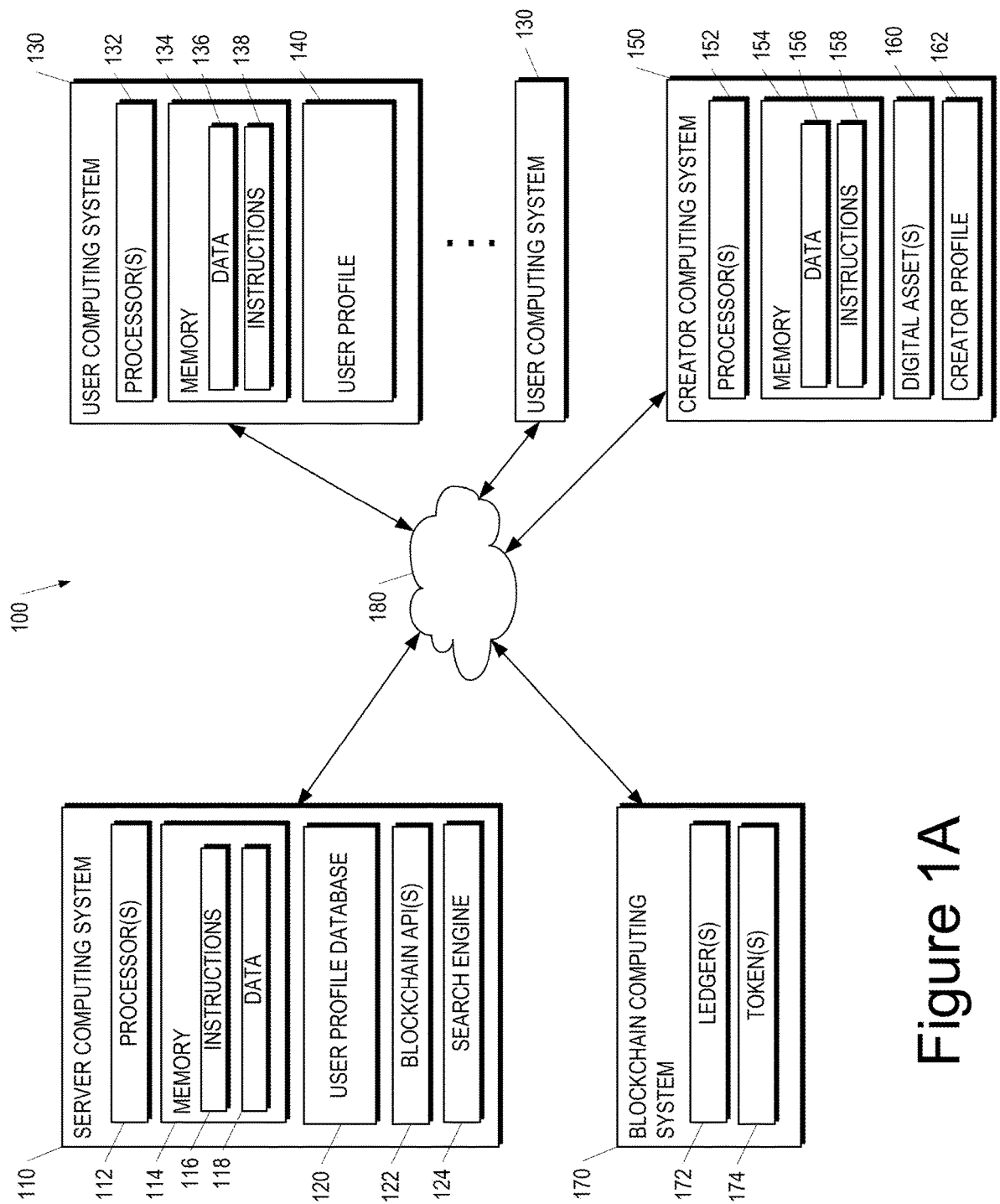
FIG. 1A depicts a block diagram of an example computing system that performs user identity management according to example embodiments of the present disclosure.

Reference numerals that are repeated across plural figures are intended to identify the same features in various implementations.

DETAILED DESCRIPTION

Overview

Generally, the present disclosure is directed to systems and methods for decentralized identity management. In particular, the systems and methods disclosed herein can leverage personal data stored on a blockchain to provide biometric data and other personal data to a third party computing system in a secure manner. For example, the systems and methods can include receiving an access request from a third party computing system. The access request can be descriptive of a request to access biological data for a particular user. In some implementations, the biological data can be stored on a blockchain. The biological data can be associated with biological characteristics of the particular user. The systems and methods can include determining a particular entity associated with the third party computing system. In some implementations, the systems and methods can include transmitting a notification to a particular user computing system. The particular user computing system can be associated with the particular user. In some implementations, the notification can be descriptive of the access request and the particular entity. The systems and methods can include receiving user input data from a particular user computing system. The user input data can be descriptive of a user response to the access request. The systems and methods can include determining an access action based on the user input data. The access action can be descriptive of a level of access to be provided to the third party computing system to the biological data on the blockchain. A viewer log can be adjusted based on the access action. The viewer log can be descriptive of one or more viewers associated with the biological data.

In particular, the systems and methods of the present disclosure can leverage a blockchain to provide a secure system for providing personal data to third parties, which can limit and/or remove the ability of third parties to copy and/or edit the personal data. Additionally and/or alternatively, the systems and methods can be leveraged to provide a user with the ability to wipe their information from the blockchain, which when paired with the mitigation of the ability to copy the personal data can allow for a user to wipe (or erase) the user data from the internet. The user can facilitate the read and write access to the personal data, which can allow the user to decide which and to what extent their data is stored and/or viewed. For example, the user can utilize the systems and methods disclosed herein to facilitate whether a particular medical service provider, insurance company, and/or biometric security provider are allowed to view the personal data. The personal data can include a user's medical history, biometric data, and/or other biological data.

The systems and methods can receive an access request from a third party computing system. The access request can be descriptive of a request to access biological data for a particular user. In some implementations, the biological data can be stored on a blockchain. The biological data can be associated with biological characteristics of the particular user. Additionally and/or alternatively, the biological data can include biometric data associated with the particular user. The biometric data can include iris data associated with the particular user. The iris data can be descriptive of one or more identifying features of an iris of the particular user. Alternatively and/or additionally, the biometric data can include face data associated with the particular user. The face data can be descriptive of one or more identifying features of a face of the particular user. In some implementations, the biometric data can include fingerprint data associated with the particular user. The fingerprint data can be descriptive of one or more identifying features of a fingerprint of the particular user.

The systems and methods can determine a particular entity associated with the third party computing system. The particular entity can be associated with a web platform. In some implementations, the particular entity may be associated with a medical service provider, an authentication computing system, and/or a government entity. Determining the particular entity can be based on obtaining and processing an internet protocol address, a device yin number, profile information, and/or transmission metadata. The determination may be based on a database of entities associated with particular web IDs.

A notification can be generated and/or transmitted to a particular user computing system. The particular user computing system can be associated with the particular user. In some implementations, the notification can be descriptive of the access request and the particular entity. The access request can include a timestamp and a particular level of access requested. The levels of access can differ based on the type of entity. For example, a medical service provider may be provided write access and read access, while a non-medical professional may be provided read access without write access. The notification can be provided to a particular user's smartphone, a smart wearable (e.g., a smartwatch or smart glasses), a tablet, and/or another computing device. In some implementations, the notification may include an option to request further information from the third party computing system.

User input data can then be received from a particular user computing system. The user input data can be descriptive of a user response to the access request. The user input data can be descriptive of approval of the request, denial of the request, and/or a partial approval. In some implementations, the user input data may be descriptive of a request for further information on the particular entity. The user input data can include a selection of an option provided via the user interface of the notification portal. The user input data may be received with a user identifier and/or a device identifier.

In some implementations, the notification generation and transmittal may be replaced and/or complemented by location determination. For example, a location of the particular user can be determined based on one or more mobile devices associated with the particular user. The location data can then be utilized to authenticate the access of the biological data based on the particular entity being a medical service provider associated with the location of the particular user (e.g., a user may be in a hospital and a hospital computer may be requesting access).

The systems and methods can determine an access action based on the user input data. The access action can be descriptive of a level of access to be provided to the third party computing system to the biological data on the blockchain. The access action can include a read call without write access. The level of access can include full access, partial access, and/or no access. In some implementations, the access action can be descriptive of a particular subset of the biological data to provide access to the third party to view. The subset can include biometric data, medical history data, and/or other biological data.

In some implementations, the access action can include providing the biological data to the third party computing system. Alternatively and/or additionally, the access action can include providing a subset of the biological data to the third party computing system.

In some implementations, the access action can include accessing a blockchain node based on the access request and identifying blockchain data associated with the particular user. The blockchain data can include the biological data. In some implementations, the blockchain data can include a view log associated with the biological data.

A view log can be adjusted based on the access action. The view log can be descriptive of one or more viewers associated with the biological data. The view log can be stored on the blockchain and may be associated with the particular user and/or the biological data.

In some implementations, the systems and methods can include causing the access action to occur and determining a view time of the access action. Adjusting the viewer log can include logging the view time associated with the access action.

Alternatively and/or additionally, the systems and methods can include determining the particular entity is associated with a medical service provider. In some implementations, the access action can include providing the biological data to the medical service provider.

The systems and methods can facilitate the access to biometric data that can be utilized for validating the identity of the particular user. For example, the systems and methods can include receiving an access request from a third party computing system. The access request can be descriptive of a request to access personal data associated with a particular user. In some implementations, the personal data can be stored on a blockchain. The personal data can include biometric data associated with the particular user. A particular entity associated with the third party computing system can be determined. The particular entity can be associated with a third party service provider. The systems and methods can include determining an access action based on whether the particular entity is associated with one or more authorized entities. The one or more authorized entities can be determined based on one or more user inputs. The systems and methods can include adjusting a view log associated with the personal data based on the access action. Adjusting the view log can include adding log data associated with the particular entity and the access request to the view log. The systems and methods can include providing blockchain data associated with the particular user. The blockchain data can include the personal data.

The systems and methods can receive an access request from a third party computing system. The access request can be descriptive of a request to access personal data associated with a particular user. In some implementations, the personal data can be stored on a blockchain. The personal data can include biometric data associated with the particular user. Alternatively and/or additionally, the personal data can include other biological data such as medical history data, drug routine, and/or blood type. The biometric data can include iris data, fingerprint data, and/or facial data that can be utilized to verify the identity of the particular user. In some implementations, the personal data can include other user data associated with the identity of the particular user.

The systems and methods can determine a particular entity associated with the third party computing system. The particular entity can be associated with a third party service provider. The third party service provider can include a medical service provider, a security provider (e.g., a security provider that utilizes fingerprint data to provide secure locks for buildings), and/or an insurance service provider.

An access action can be determined based on whether the particular entity is associated with one or more authorized entities. The one or more authorized entities can be determined based on one or more user inputs. The one or more authorized entities can be determined based on an authorization list. Alternatively and/or additionally, the one or more authorized entities can be determined based on the type of entity. For example, the particular entity may be determined to be a medical entity, a government entity, a research entity, and/or an insurance entity.

A view log associated with the personal data can then be adjusted based on the access action. Adjusting the view log can include adding log data associated with the particular entity and the access request to the view log. The view log can include a plurality of entries associated with a plurality of different accesses provided to a plurality of different third parties. The view log can include the time of access and one or more identifiers associated with the particular third party who accessed the personal data. The one or more identifiers can include internet protocol addresses, web IDs, data associated with a web profile, a blockchain ID, and/or a hash function.

The systems and methods can provide blockchain data associated with the particular user. The blockchain data can include the personal data. For example, the blockchain data can include encrypted personal data and may include information descriptive of times and dates for different medical exams for the particular user.

The systems and methods can generate and store log data on a blockchain in association with the viewing of the personal data by third parties. For example, the systems and methods can include providing personal data to a third party computing system. The personal data can be associated with a particular user. In some implementations, the personal data can be stored on a blockchain. The systems and methods can include determining a particular entity associated with the third party computing system. The particular entity can be associated with one or more web identifiers. The systems and methods can include determining a view time associated with the third party computing system having access to the personal data and generating log data based on the particular entity and the view time. The log time can be descriptive of the one or more web identifiers and the view tine. In some implementations, the systems and methods can include storing the log data in association with the personal data.

The systems and methods can provide personal data to a third party computing system. The personal data can be associated with a particular user. In some implementations, the personal data can be stored on a blockchain. The personal data can include biological data. The biological data can include medical history data, biometric data, and/or general identity-specific data (e.g., blood type and/or birth information).

The systems and methods can determine a particular entity associated with the third party computing system. The particular entity can be associated with one or more web identifiers. The particular entity can include a hospital, an employer, an insurance company, a security company, a dentist, a general practitioner, a medical specialist, and/or a blood donation company.

A view time associated with the third party computing system having access to the personal data can then be determined. The view time can be determined by accessing an internal clock of a computing system. The view time may be based on the time of request and/or may be based on the time of the access occurring.

Log data can be generated based on the particular entity and the view time. The log time can be descriptive of the one or more web identifiers and the view time. The log data may include metadata associated with the type of access, the view duration of the access, and/or the level of access provided to the particular third party computing system.

The log data can then be stored in association with the personal data. The log data can be stored with previous log data of a view log. The view log can store data associated with the interactions with the personal data, which can include a read call, a write call, and/or download call.

The personal data, the view log, and/or the authorization data may be encrypted when stored on the blockchain. The encryption can utilize one or more cryptographic techniques. In some implementations, the blockchain data can include one or more pointers to the personal data stored in a user database.

The blockchain can be utilized to verify what gets accessed and what gets written, which may minimize the possibility of a bulk copy of data. Additionally and/or alternatively, the systems and methods can add medical history and biometric data to a blockchain log. In some implementations, the systems and methods can add biological data to blockchain.

In some implementations, the personal data can be utilized to determine and/or provide preliminary predictions to medical service providers based on the medical history and/or one or more input symptoms (e.g., a medical service provider can access the medical history and provide their own report, which can be processed with the medical history to provide a preliminary diagnosis). The user may be able to select what data is saved and what data is not allowed to be documented and stored.

In some implementations, the systems and methods can include a black box neural network model stored to the blockchain and trained on the biological data associated with the particular user. The third party computing system may build a second machine-learned model on top of the other machine-learned model.

An authorization list (e.g., a permissions list associated with the user) can be managed via a mobile application.

The systems and methods disclosed herein can allow a user to easily move data from one application to another. The user can be aggregated on the blockchain to store data from a plurality of medical service providers to be later provided to a plurality of other medical service providers.

The personal data can be stored on a blockchain with one or more token IDs associated with the user. The personal data can include account IDs associated with the user and one or more third parties.

In some implementations, the access action can include a read call and/or can include a write call.

In some implementations, virtual reality data and/or augmented-reality data can be stored on the blockchain. Additionally and/or alternatively, medical history data, biometric data, non-fungible token data, personal information, profile information, tags, application data, payment data, addresses, names, drivers license data, passport data, and identity data can be stored as part of the user data.

The systems and methods can include embedding a unique hidden code in the personal data, which can be identified during scans for the hidden code or fingerprint. Additionally and/or alternatively, the systems and methods can include an application that runs on a protected virtual machine, which is utilized to read the personal data to provide temporary, but not permanent, access.

The systems and methods of the present disclosure provide a number of technical effects and benefits. As one example, the system and methods can provide systems and methods for providing secure management of personal data for a user. For example, the systems and methods disclosed herein can leverage blockchain technology to prevent the duplication and localization of the personal data and can be utilized to control who can edit and/or add to the user data.

Another technical benefit of the systems and methods of the present disclosure is the ability to leverage a notification interface to provide a user interface to a user to allow for the selection of which requesters can access their data. Additionally, data associated with the viewers can be logged to track who and to what extent the personal data is viewed and/or interacted with by third parties. For example, the systems and methods disclosed herein can process an access request, determine an entity associated with the requestor, generate a notification based on the request and the entity, transmit the notification, and obtain, in return, input data descriptive of whether the requestor can access the personal data. Data associated with the particular entity can then be logged in a view log in case an audit of viewers occurs.

Another example of technical effect and benefit relates to improved computational efficiency and improvements in the functioning of a computing system. For example, the systems and methods disclosed herein can leverage the blockchain storage to limit the amount of power required to edit and or delete personal data being utilized by a plurality of third parties. In particular, a user can augment a single dataset instead of having to navigate to a plurality of web pages to edit a plurality of datasets, which may be redundant to one another.

With reference now to the Figures, example embodiments of the present disclosure will be discussed in further detail.

Example Devices and Systems

FIG. 1A depicts a block diagram of an example computing system 100 that performs user identity management according to example embodiments of the present disclosure. The system 100 includes a user computing system 130, a server computing system 110, a creator computing system 150, and a blockchain computing system 170 that are communicatively coupled over a network 180.

The user computing system 130 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the user computing system 130 to perform operations.

The user computing system 130 can also include one or more user input components that receive user input. For example, the user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 110 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 118 and instructions 116 which are executed by the processor 112 to cause the server computing system 110 to perform operations.

In some implementations, the server computing system 110 includes or is otherwise implemented by one or more server computing devices. In instances in which the server computing system 110 includes plural server computing devices, such server computing devices can operate according to sequential computing architectures, parallel computing architectures, or some combination thereof.

The blockchain computing system 170 includes one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store data and instructions which are executed by the processor to cause the blockchain computing system 170 to perform operations. In some implementations, the blockchain computing system 170 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The computing system 100 can include a number of applications (e.g., applications 1 through N). Each application can be in communication with a central intelligence layer. Example applications can include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can communicate with a central device data layer. The central device data layer can be a centralized repository of data for the computing system 100. In some implementations, the central device data layer can communicate with a number of other components of the computing device, such as, for example, one or more sensors, a context manager, a device state component, and/or additional components. In some implementations, the central device data layer can communicate with each device component using an API (e.g., a private API).

Additionally and/or alternatively, FIG. 1A depicts an exemplary computing system 100 that can be used to implement personal data access authorization according to aspects of the present disclosure. The system 100 has a user-server architecture that includes a server 110 that communicates with one or more user computing systems 130 over a network 180. However, the present disclosure can be implemented using other suitable architectures, which can include any number of computing systems communicating over a network 180.

The system 100 includes a server 110, such as, for example, a web server. The server 110 can be one or more computing devices that are implemented as a parallel computing system and/or a distributed computing system. In particular, multiple computing devices can act together as a single server 110. The server 110 can have one or more processor(s) 112 and a memory 114. The server 110 can also include a network interface used to communicate with one or more remote computing devices (e.g., user devices) 130 over a network 180.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement index adjustment (e.g., index deduplication). The user profile database 120 can be configured to store a plurality of user profiles associated with a plurality of users utilizing one or more user computing systems 130. In some implementations, the user profile database 120 can be configured to be utilized for facilitating one or more interactions. The facilitation of the one or more interactions can involve the use of a blockchain application programming interface (API) 122 to send data to and receive data from a blockchain computing system 170. For example, a server computing system 110 can utilize the blockchain API 122 to update one or more ledgers 172 of the blockchain computing system 170. The one or more ledgers 172 can be associated with one or more tokens 174. The one or more tokens 174 can include one or more non-fungible tokens, which can include scripts associated with a digital asset (e.g., image data, video data, text data, latent encoding data, domain data, audio data, augmented-reality asset rendering data, and/or virtual-reality asset rendering data). In particular, the script can reference a specific digital asset that is provided for sale. The digital asset can include image data, text data, video data, latent encoding data, a domain name, a virtual property, an augmented-reality asset, a virtual-reality asset (e.g., a virtual-reality environment and/or a virtual-reality object for interaction in an environment), a smart contract, a physical item authentication, etc. In some implementations, the one or more ledgers 172 can be associated with cryptocurrency that can be utilized to make transactions in a physical marketplace and/or a virtual marketplace.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include data 118 that can be retrieved, manipulated, created, or stored by processor(s) 112. The data 118 can include search result data, ranking data, image data (e.g., digital maps, satellite images, aerial photographs, street-level photographs, synthetic models, paintings, personal images, portraits, etc.), video data, audio data, text data (e.g., books, articles, blogs, poems, etc.), latent encoding data, blockchain address data, tables, vector data (e.g., vector representations of roads, parcels, buildings, etc.), point of interest data (e.g., locales such as islands, cities, restaurants, hospitals, parks, hotels, and schools), or other data or related information. As an example, the data 118 can be used to access information and data associated with a specific digital asset, website, search result, blockchain, etc.

The data 118 can be stored in one or more databases. The one or more databases can be connected to the server 110 by a high bandwidth LAN or WAN, or can also be connected to server 110 through network 180. The one or more databases can be split up so that they are located in multiple locales.

The server 110 can exchange data with one or more user computing systems 130 over the network 180. Although two user computing systems 130 are illustrated in FIG. 1A, any number of user computing systems 130 can be connected to the server 110 over the network 180. The user computing systems 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, the user computing system 130 can be multiple computing devices acting together to perform operations or computing actions.

Similar to server 110, a user computing system 130 can include a processor(s) 132 and a memory 134. The memory 134 can store information accessible by processor(s) 132, including instructions that can be executed by processor(s) and data. As an example, memory 134 can store data 136 and instructions 138.

Instructions 138 can provide instructions for implementing a browser, a non-fungible token purchase, and/or a plurality of other functions. In particular, the user of user computing system 130 can exchange data with server 110 by using the browser to visit a website accessible at a particular web-address. The personal data management of the present disclosure can be provided as an element of a user interface of a website and/or application.

The data 136 can include data related to running a specialized application on the user computing system 130. In particular, the specialized application can be used to exchange data with server 110 over the network 180. The data 136 can include user-device-readable code for providing and implementing aspects of the present disclosure. Additionally and/or alternatively, the data 136 can include data related to previously inputted or received data. For example, the data 136 can include data related to past occurrences of the special application.

The user computing system 130 can include various user input devices for receiving information from a user, such as a touch screen, touch pad, data entry keys, speakers, mouse, motion sensor, and/or a microphone suitable for voice recognition. Further, the user computing system 130 can have a display for presenting information, such as a user interface, displaying a digital asset, displaying pop-ups or application elements displayed in an interface, and/or other forms of information.

The user computing system 130 can also include a user profile 140 that can be used to identify a user of the user computing system 130. The user profile 140 can be optionally used by the user to make one or more transactions which can then be recorded on one or more ledgers 172 of the blockchain computing system 170. The user profile 140 can be descriptive of user information, which can include identification numbers and/or payment account information. For example, the user profile 140 can include data associated with a crypto wallet, which may be linked to a browser application via an application extension and/or embedding.

The user computing system 130 can further include a graphics processing unit. Graphics processing unit can be used by processor 132 to index adjustment. In some embodiments, the user computing system 130 performs any and all index adjustment.

The user computing system 130 can include a network interface for communicating with a server 110 over a network 180. Network interface can include any components or configuration suitable for communication with server 110 over network 180, including, for example, one or more ports, transmitters, wireless cards, controllers, physical layer components, or other items for communication according to any currently known or future developed communications protocol or technology.

The network 180 can be any type of communications network, such as a local area network (e.g., intranet), wide area network (e.g., Internet), or some combination thereof. The network 180 can also include a direct connection between user computing system 130 and the server 110. In general, communication between the server 110 and a user computing system 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the exemplary computing system 100 can include one or more creator computing systems 150. The one or more creator computing systems 150 can be utilized for generating images, videos, prose, poetry, audio, etc., which can then be provided for sale. The one or more creator computing systems 150 can include one or more processors 152, which can be utilized to execute one or more operations to implement the systems and methods disclosed herein. The one or more creator computing systems 150 can include one or more memory components 154, which can be utilized to store data 156 and one or more instructions 158. The data 156 can include data related to one or more applications, one or more media datasets, etc. The instructions 158 can include one or more operations for implementing the systems and methods disclosed herein.

The one or more creator computing systems 150 can store data associated with one or more digital assets 160 and/or one or more creator profiles 162. The one or more digital assets 160 can include text data, image data, video data, audio data, latent encoding data, domain data, or a variety of other data formats. The one or more creator profiles 162 can include information associated with one or more "creators" of the one or more digital assets 160. The one or more creator profiles 162 can include identification data, transaction data, and/or crypto wallet data.

Additionally and/or alternatively, the exemplary computing system 100 can include one or more blockchain computing systems 170. The one or more blockchain computing systems 170 can include a plurality of computing devices being utilized for decentralized data storage, such that a plurality of "blocks" can be distributed throughout a network of computing devices to provide a secure system for data storage, which can include one or more ledgers 172 and one or more tokens 174. In some implementations, each of the one or more tokens 174 can be associated with at least a portion of the one or more ledgers 172.

Blockchain can refer to a system configured to securely record information. The blockchain can include a decentralized system that can render changing information extremely difficult. The blockchain can include a digital ledger of transactions that can be duplicated and distributed across a network of computing systems. Each block in the chain can include a number of transactions. When a new transaction occurs on the blockchain, a record of that transaction can be added to every computing device's ledger. The blockchain can be utilized to track the exchange of currency and/or digital assets via the recording of transactions on the digital ledger, which can be propagated throughout the decentralized system. The currency exchanged and tracked via the blockchain computing system 170 can be referred to as cryptocurrency.

The tokens 174 can include one or more non-fungible tokens. The non-fungible tokens can be minted on a blockchain associated with the blockchain computing system 170. A non-fungible token (NFT) can be a certificate of authenticity of a digital asset. NFTs can be non-interchangeable thus making their worth depend on the price anyone may be willing to pay for the asset. NFTs can be printed on blockchains such that their scarcity and authenticity can be maintained. A digital asset can be defined as anything that is stored digitally and can be uniquely identifiable that organizations can use to realize value. Examples of digital assets can include a tweet, a social media comment, documents, audio, images, videos, logos, website domains, slide presentations, spreadsheets, CSS files and formats, executable code, and/or websites.

Figure 1B:
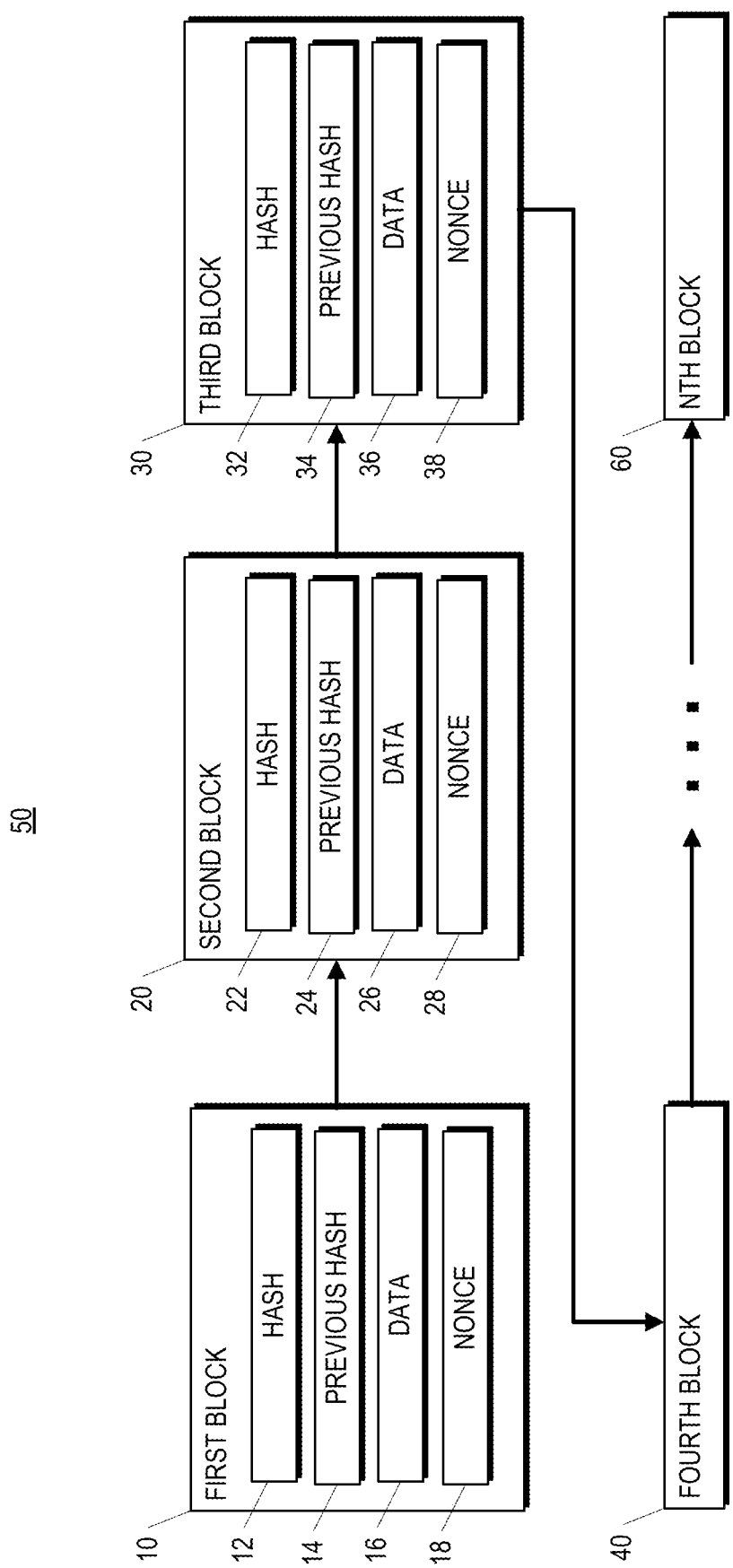
FIG. 1B depicts a block diagram of an example computing device that performs identity management according to example embodiments of the present disclosure.

FIG. 1B depicts a block diagram of an example blockchain 50 that may be utilized by the blockchain computing system 170 of the exemplary computing system 100 of FIG. 1A. The example blockchain 50 can include a plurality of blocks that can be utilized to store data with one or more cryptographic features. The blockchain 50 can be stored on a decentralized computing system comprising a plurality of computing devices. The blockchain 50 can be a public blockchain (e.g., a blockchain that is open without access restrictions such that anyone with an internet access can send transactions or validate transactions as part of the decentralized, distributed system), a private blockchain (e.g., a blockchain that provides access based on permissions set by network administrators), or a hybrid blockchain (e.g., a blockchain with a combination of blocks with no restrictions and blocks with restrictions). The blockchain 50 can include proof of work features that can include one or more cryptographic forms of proof. The proof of work can be provided upon a request to update the blockchain 50 (e.g., a request to update the ledgers based on a new transaction). The proof of work can convey that a certain device or group of devices have performed a certain amount of computation, which can then be validated by other parties. Once validated, the blockchain 50 can be updated, or may remain unchanged in response to a failure to validate. The proof of work feature can be utilized to mitigate the computational cost of every device in the system having to perform the same computational functions and checks for determining a request is valid for updating the blockchain 50.

Each block can include a hash, a previous hash associated with the hash of the previous block, and data. In some implementations, each block can include a nonce. A hash can be a hash value of a fixed length that can be a fingerprint for the particular block. The hash value can be generated based on a hash function and may be changed each time a change is made to the data of that particular block. The previous hash can include a hash value of the block immediately preceding the particular block. The previous hash can be utilized to ensure the downstream ground truth stays unchanged unless proper validation occurs. The data can include transaction data (e.g., a transaction ledger), a timestamp, a value associated with a cryptocurrency value, a non-fungible token (e.g., a non-fungible token including a script that references a digital asset, nonce data, and/or general blockchain data. Nonce (i.e., a number only used once) can be a number added to a block in a blockchain that can meet a difficulty level restriction when a block is rehashed. The nonce can be a number that blockchain miners are solving for, in order to receive an incentive (e.g., cryptocurrency).

The blockchain 50 can include one or more security protocols and/or features. The blockchain 50 can include a cryptographic system. For example, the blockchain 50 can validate the blockchain 50 is valid by ensuring the stored previous hash stored in the block matches the hash value of the previous block from the last block back to the first block (e.g., the genesis block). In some implementations, the blockchain 50 can include proof of work validation that can rely on verifying proof of computation before implementing a change to the stored data (e.g., the stored ledger). Proof of work validation can take seconds, minutes, and/or hours based in part on the number of blocks in the blockchain 50. Additionally and/or alternatively, the blockchain 50 can be implemented on a distributed, decentralized computing system. In some implementations, each computing device in the distributed, decentralized computing system can store a portion of (e.g., a block of the plurality of blocks) or all of the blocks in the blockchain 50. Therefore, the system can verify data by ensuring the data is uniform across most, if not all, of the distributed system. Each node of the distributed system can be checked for tampering before adding new data.

The data can include data associated with a cryptocurrency value (e.g., a ledger associated with a specific cryptocurrency value), data associated with a digital asset (e.g., a non-fungible token minted on the blockchain 50 that can include a script associated with the digital asset), data associated with a smart contract (e.g., a smart contract that includes conditions that automatically initiates an action in response to a criteria being met), and/or timestamp data (e.g., timestamp data for block creation, minting, a transaction, etc.).

In particular, FIG. 1B depicts a first block 10, a second block 20, a third block 30, a fourth block 40, and an nth block 60. Although five blocks are depicted, any number of blocks can be utilized. The first block 10 can be a genesis block (e.g., a first overall block in the blockchain). The first block 10 can include a respective first hash 12 (e.g., a hash value associated with the first block 10). The first block 10 may include a first previous hash 14 (e.g., if the first block 10 has a block before it in the blockchain 50, then the hash of the previous block can be stored on the first block 10). Additionally and/or alternatively, the first block 10 can include data 16 and nonce 18.

The second block 20 can follow the first block 10. The second block 20 can include a respective second hash 22 (e.g., a hash value associated with the second block 20). The second block 20 may include a second previous hash 24 (e.g., the second previous hash 24 can be the same as, or reference, the first hash 12). Additionally and/or alternatively, the second block 20 can include data 26 and nonce 28.

The third block 30 can follow the second block 20. The third block 30 can include a respective third hash 32 (e.g., a hash value associated with the third block 30). The third block 30 may include a third previous hash 34 (e.g., the third previous hash 34 can be the same as, or reference, the second hash 22). Additionally and/or alternatively, the third block 30 can include data 36 and nonce 38.

Additionally and/or alternatively, the fourth block 40, the nth block 60, and other potential blocks can include a respective hash, a respective previous hash, and data. The first data 16, the second data 26, the third data 36, and the data of the other blocks can include overlapping data, can differ, and/or be the same such that the data is duplicative for all blocks. In some implementations, each block can be associated with a different transaction (e.g., a different minting, a different sale, etc.). The first nonce 18, the second nonce 28, the third nonce 38, and the nonce's of the other blocks can differ and may be solved during mining.

The data in each block can include ledger data, which can include a timestamp, asset and/or cryptocurrency exchanged, actors involved in transaction, and/or a variety of other information.

In some implementations, a plurality of different blockchains can be utilized for the systems and methods disclosed herein. The different blockchains can include different configurations. The different blockchains can include parallel chains, side chains, shared blocks, differing chains, varying permissions, varying purposes, varying number of blocks, and/or varying hash functions and/or varying hashing value lengths.

In some implementations, the systems and methods can include one or more machine-learned model computing systems 900. The one or more machine-learned models can be utilized for a variety of tasks for enabling token data identification, obtainment, indexing, and deduplication.

Figure 9A:
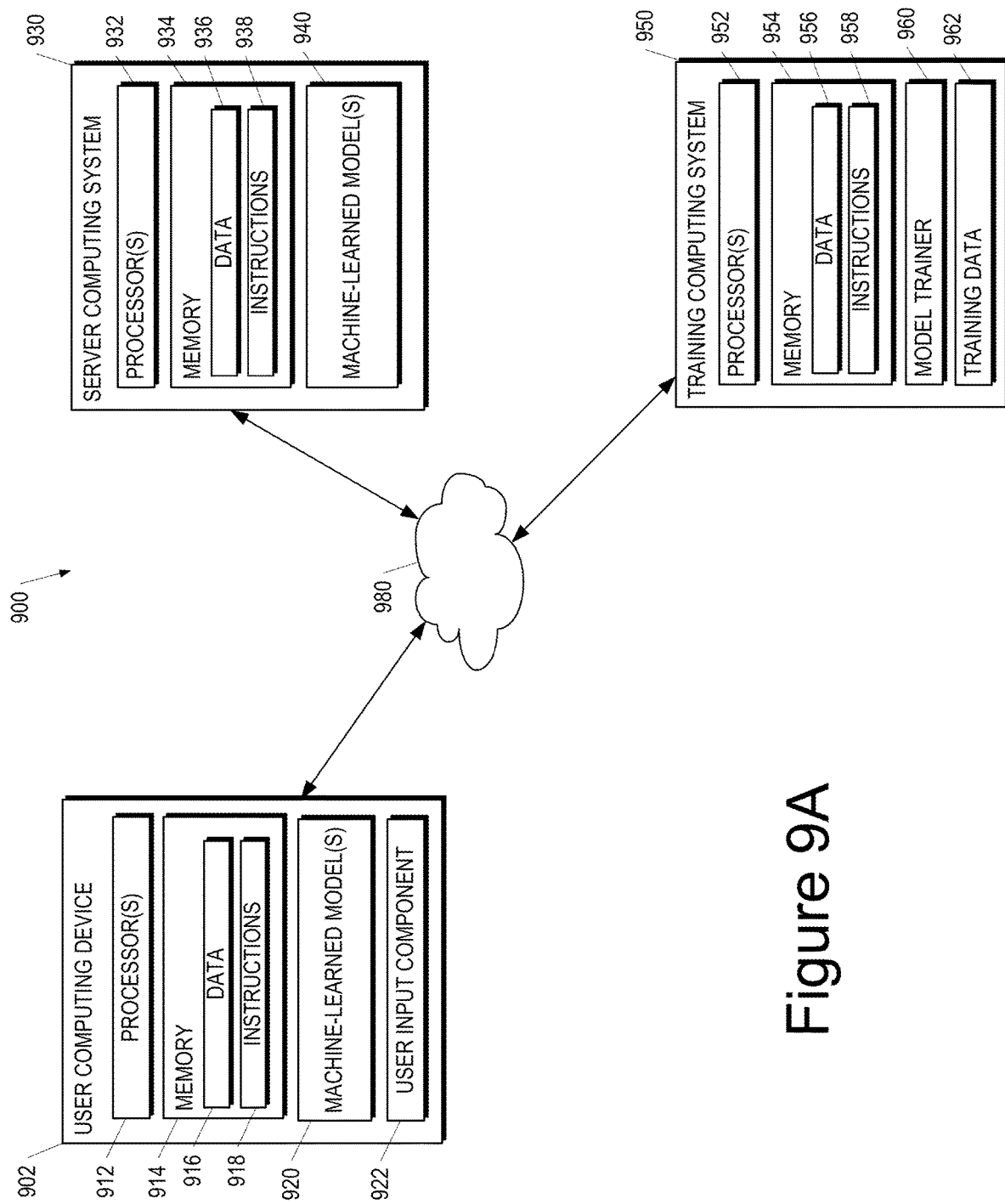
FIG. 9A depicts a block diagram of an example computing system that performs identity management according to example embodiments of the present disclosure.

FIG. 9A depicts a block diagram of an example computing system 900 that performs user identity management according to example embodiments of the present disclosure. The system 900 includes a user computing device 902, a server computing system 930, and a training computing system 950 that are communicatively coupled over a network 980.

The user computing device 902 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing device 902 to perform operations.

In some implementations, the user computing device 902 can store or include one or more machine-learned models 920. For example, the machine-learned models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 920 are discussed with reference to FIGS. 2 & 3.

In some implementations, the one or more machine-learned models 920 can be received from the server computing system 930 over network 980, stored in the user computing device memory 914, and then used or otherwise implemented by the one or more processors 912. In some implementations, the user computing device 902 can implement multiple parallel instances of a single machine-learned model 920 (e.g., to perform user-specific prediction or suggestion across multiple instances of third party service providers).

More particularly, the machine-learned model 920 can include one or more detection models, one or more segmentation models, one or more classification models, one or more augmentation models, one or more generation models, and/or one or more feature extractor models. The machine-learned model 920 can process input data to generate a suggestion and/or a prediction specific to the particular user.

Additionally or alternatively, one or more machine-learned models 940 can be included in or otherwise stored and implemented by the server computing system 930 that communicates with the user computing device 902 according to a client-server relationship. For example, the machine-learned models 940 can be implemented by the server computing system 930 as a portion of a web service (e.g., a personalization service). Thus, one or more models 920 can be stored and implemented at the user computing device 902 and/or one or more models 940 can be stored and implemented at the server computing system 930.

The user computing device 902 can also include one or more user input components 922 that receive user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned models 940. For example, the models 940 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIGS. 2 & 3.

The user computing device 902 and/or the server computing system 930 can train the models 920 and/or 940 via interaction with the training computing system 950 that is communicatively coupled over the network 980. The training computing system 950 can be separate from the server computing system 930 or can be a portion of the server computing system 930.

The training computing system 950 includes one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the training computing system 950 to perform operations. In some implementations, the training computing system 950 includes or is otherwise implemented by one or more server computing devices.

The training computing system 950 can include a model trainer 960 that trains the machine-learned models 920 and/or 940 stored at the user computing device 902 and/or the server computing system 930 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 960 can perform a number of generalization techniques (e.g., weight decays, dropouts, etc.) to improve the generalization capability of the models being trained.

In particular, the model trainer 960 can train the machine-learned models 920 and/or 940 based on a set of training data 962. The training data 962 can include, for example, training blockchain data, training biometric data, training medical history data, training symptom data, ground truth labels, ground truth information, and/or ground truth segmentation masks.

In some implementations, if the user has provided consent, the training examples can be provided by the user computing device 902. Thus, in such implementations, the model 920 provided to the user computing device 902 can be trained by the training computing system 950 on user-specific data received from the user computing device 902. In some instances, this process can be referred to as personalizing the model.

The model trainer 960 includes computer logic utilized to provide desired functionality. The model trainer 960 can be implemented in hardware, firmware, and/or software controlling a general purpose processor. For example, in some implementations, the model trainer 960 includes program files stored on a storage device, loaded into a memory and executed by one or more processors. In other implementations, the model trainer 960 includes one or more sets of computer-executable instructions that are stored in a tangible computer-readable storage medium such as RAM hard disk or optical or magnetic media.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 9A illustrates one example computing system that can be used to implement the present disclosure. Other computing systems can be used as well. For example, in some implementations, the user computing device 902 can include the model trainer 960 and the training dataset 962. In such implementations, the models 920 can be both trained and used locally at the user computing device 902. In some of such implementations, the user computing device 902 can implement the model trainer 960 to personalize the models 920 based on user-specific data.

Figure 9B:
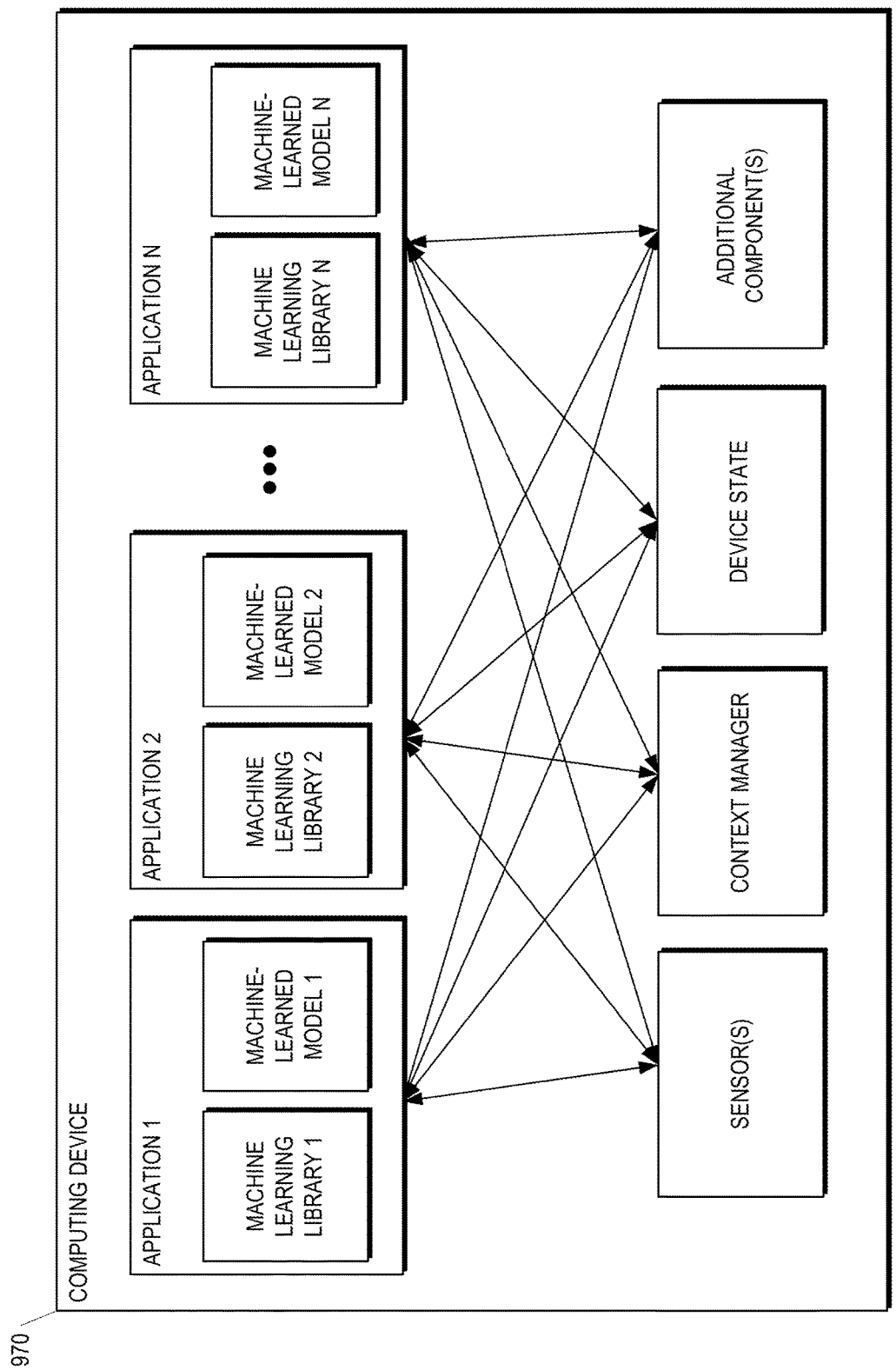
FIG. 9B depicts a block diagram of an example computing device that performs identity management according to example embodiments of the present disclosure.

FIG. 9B depicts a block diagram of an example computing device 970 that performs according to example embodiments of the present disclosure. The computing device 970 can be a user computing device or a server computing device.

The computing device 970 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 9B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 9C:
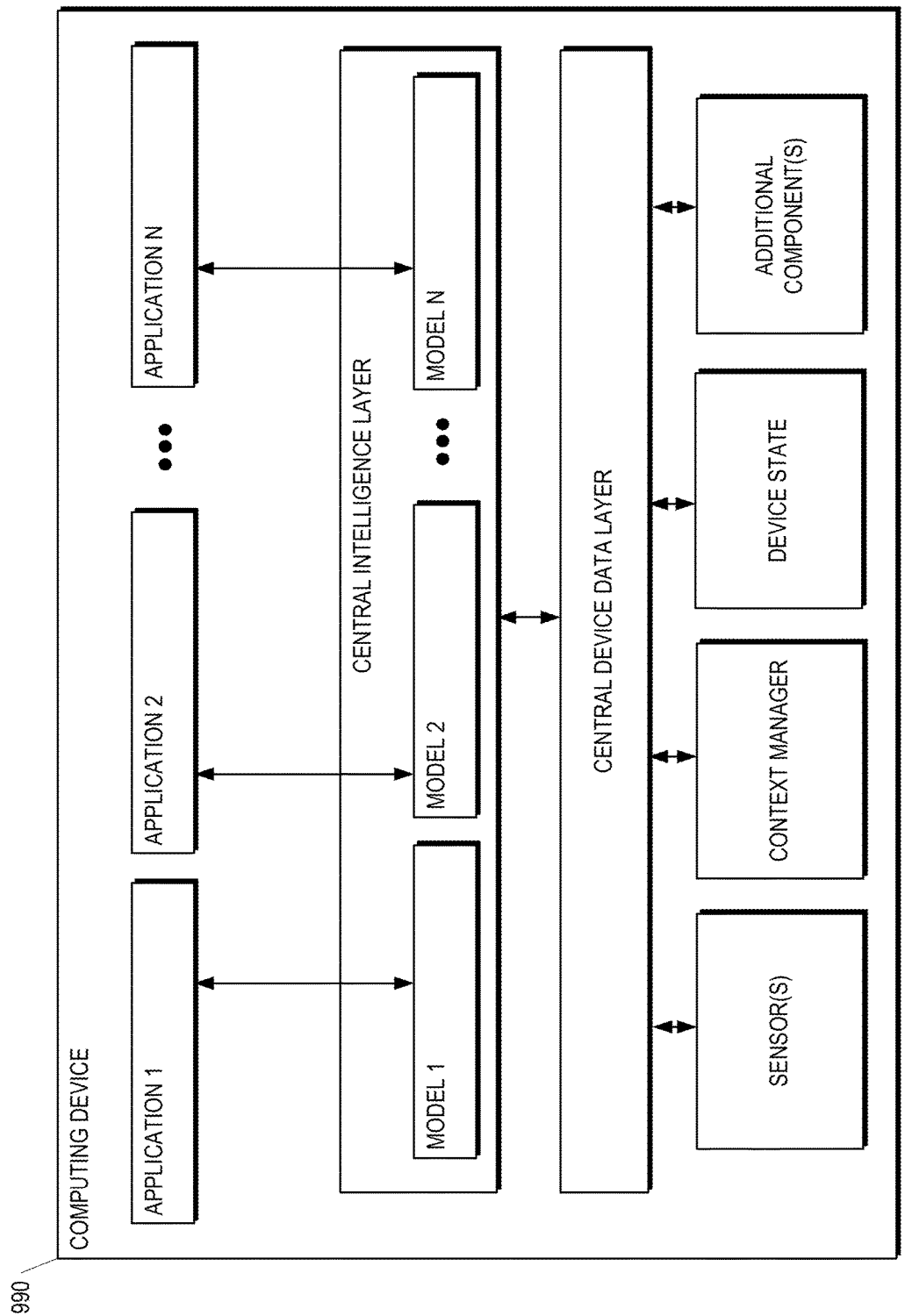
FIG. 9C depicts a block diagram of an example computing system that performs identity management according to example embodiments of the present disclosure.

FIG. 9C depicts a block diagram of an example computing device 990 that performs according to example embodiments of the present disclosure. The computing device 990 can be a user computing device or a server computing device.

The computing device 990 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 9C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 990.

The central intelligence layer can communicate with a central device data layer. The central device data layer can be a centralized repository of data for the computing device 990. As illustrated in FIG. 9C, the central device data layer can communicate with a number of other components of the computing device, such as, for example, one or more sensors, a context manager, a device state component, and/or additional components. In some implementations, the central device data layer can communicate with each device component using an API (e.g., a private API).

Example System Arrangements

Figure 2:
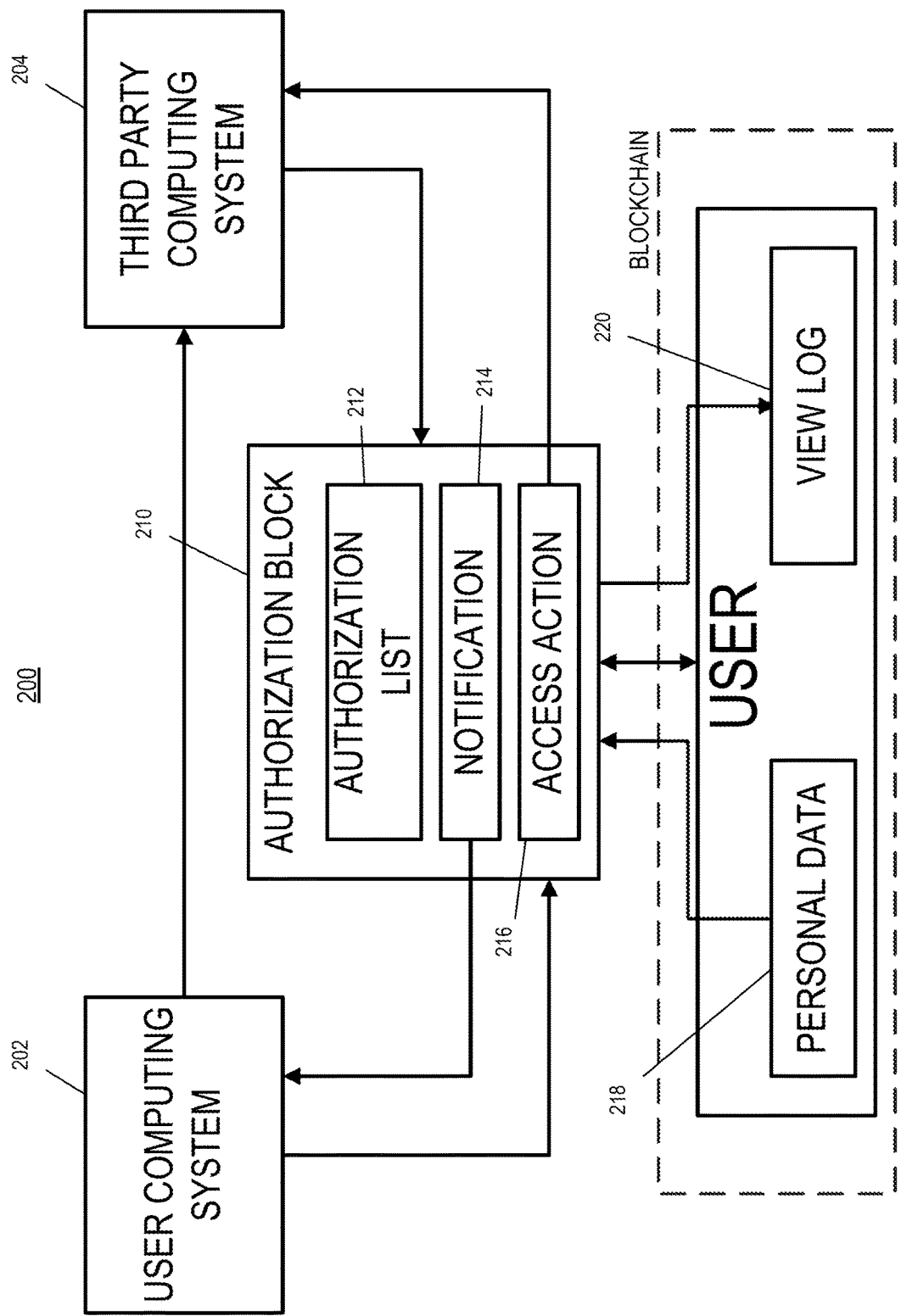
FIG. 2 depicts a block diagram of an example access authorization system according to example embodiments of the present disclosure.

FIG. 2 depicts a block diagram of an example access authorization system according to example embodiments of the present disclosure. In some implementations, the access authorization system 200 can be configured to receive an access request from a third party computing system 204 descriptive of a request to access user data (e.g., personal data 218 and/or a view log 220) associated with a particular user and, as a result of receipt of the access request from a third party computing system 204, provide access action 216 that is descriptive of a level of access provided to the third party computing system 204. Thus, in some implementations, the access authorization system 200 can include an authorization block 210 that facilitates the authorization determination.

For example, a user computing system 202 can communicate with a third party computing system 204 (e.g., a third party computing system associated with a medical service provider, a security system provider, a government entity, an insurance provider, and/or a web platform). The third party computing system 204 can generate an access request in response to the interaction (e.g., the user computing system 202 may send a medical request and/or a security request associated with the third party computing system 204, which can trigger a request to receive user data to better tailor the search results). The access request can be obtained and processed by an authorization block 210. The authorization block 210 can include one or more deterministic functions. Alternatively and/or additionally, the authorization block 210 can include a machine-learned model trained on previous authorization interactions by the user.

The authorization block 210 can process the access request to determine whether the third party computing system is associated with an authorized entity (e.g., an authorized web domain, an authorized medical service provider, an authorized security system provider, and/or an authorized web platform) by comparing the identification data against an authorization list 212 of authorized entities. Alternatively and/or additionally, the authorization block 210 can generate a notification 214 that can be sent to the user computing system 202 prompting an input from the user. The authorization block 210 can then receive an authorization input, a semi-authorization input, and/or a no authorization input from the user computing system 202. The authorization block 210 can then determine and/or generate an access action 216 based on the user input. The access action 216 may include providing access to personal data 218 to the third party computing system 204. In some implementations, the personal data 218 and/or the view log 220 may be stored on a blockchain. Access to the personal data 218 can include providing a viewing interface to the third party computing system 204 that allows the third party to view the data and/or interact with the data without augmenting or copying the data.

In some implementations, in response to providing access to the personal data 218, log data can be generated and added to the view log 220. The log data can include a time of access, a duration of access, a type of access (e.g., view access, copy access, and/or edit access), and/or the particular entity. The log data can be written onto the blockchain. The view log 220 and the personal data 218 can be associated with the particular user and may be paired with a user-specific blockchain ID. In some implementations, the personal data 218 and/or the view log 220 may be associated with a token ID. Providing access to the personal data can include obtaining and/or utilizing one or more public keys and/or one or more private keys.

Figure 3:
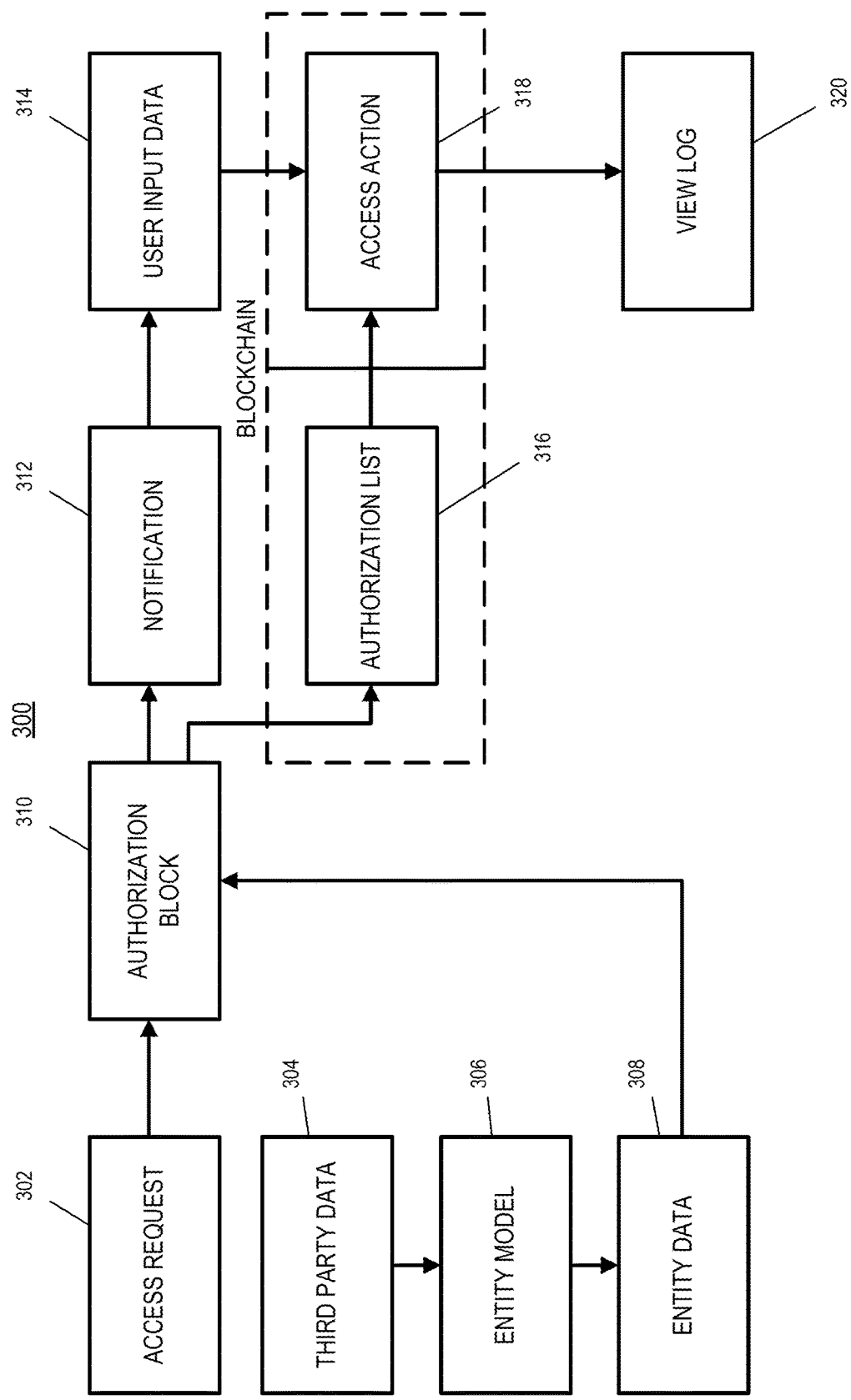
FIG. 3 depicts a block diagram of an example access action determination system according to example embodiments of the present disclosure.

FIG. 3 depicts a block diagram of an example access action determination system 300 according to example embodiments of the present disclosure. In particular, an access request 302 and third party data 304 can be obtained from a third party computing system. The third party data 304 can be processed with an entity model 306 to generate entity data 308. The entity data 308 can be descriptive of a particular entity associated with the third party computing system. Alternatively and/or additionally, the entity data 308 can be descriptive of a type of entity (e.g., a medical provider entity, a security system entity, a government entity, and/or an insurance entity) associated with the third party computing system.

The access request 302 and the entity data 308 can be processed with an authorization block 310. The authorization block 310 may generate a notification 312 descriptive of the access request 302 and the entity data 308. The notification 312 can be transmitted to a user computing system, which can return user input data 314 in response to a selection of a user interface element of the notification 312. For example, a selection of a level of access element in the user interface of the notification 312. An access action 318 can then be determined based on the user input data 314.

Alternatively and/or additionally, the authorization block 310 can obtain an authorization list 316 associated with the particular user. The entity data 308 can be processed with the authorization list 316 to determine if the entity data 308 is associated with a particular line item of the authorization list 316. If an association is determined, the access request and the line item can be compared to determine whether the type of access and/or the level of access meet the pre-authorization type and level for the particular entity or particular entity type. Based on the processing, an access action 318 can be determined. The access action can include providing full access to the user data, access to only certain types of user data, or no access to the user data. Alternatively and/or additionally, the access action 318 can include a read call and/or a write call. A view log 320 may be adjusted based on the access action 318. For example, the entity data 308, the time of access, the type of access, and what was done during the access may be added to the view log 320.

Figure 4:
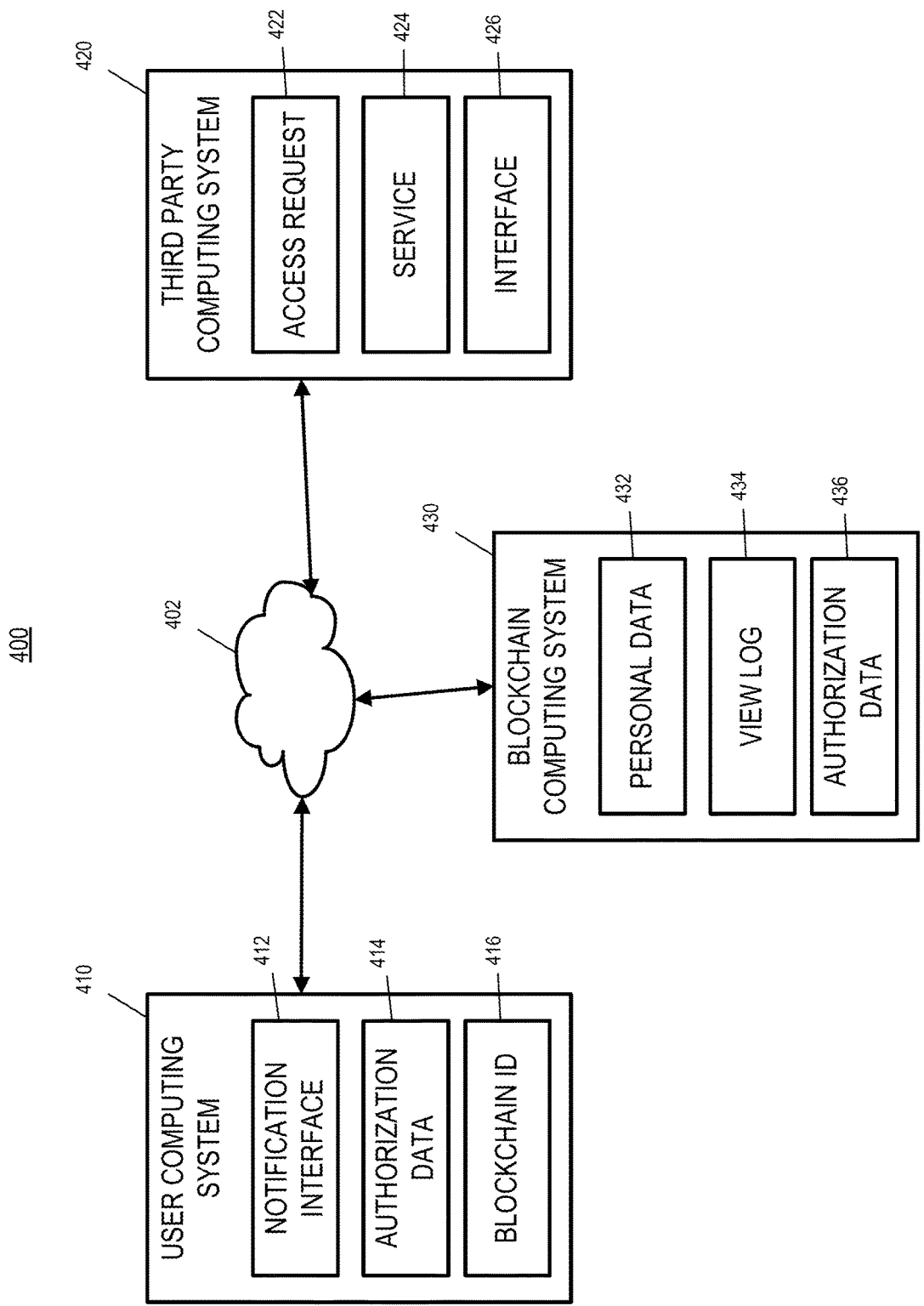
FIG. 4 depicts a block diagram of an example computing system that performs personal data access authorization according to example embodiments of the present disclosure.

FIG. 4 depicts a block diagram of an example computing system that performs personal data access authorization 400 according to example embodiments of the present disclosure. In particular, the computing system that performs personal data access authorization 400 can include a user computing system 410, a third party computing system 420, and/or a blockchain computing system 430. The user computing system 410, the third party computing system 420, and the blockchain computing system 430 can communicate over a network 402. The various computing systems can communicate with one another in order to facilitate the exchange of user data to generate a more user-specific prediction or suggestion with regards to a service provided by the third party.

The user computing system 410 can include a notification interface 412, storage of authorization data 414, and/or a blockchain ID 416. The notification interface 412 can be part of a user interface for providing notifications for display. Additionally and/or alternatively, the notification interface 412 can receive one or more user inputs associated with a selection of a level of access to be provided to the third party web platform. The authorization data 414 can include instructions for determining and/or implementing access actions. Additionally and/or alternatively, the authorization data 414 can include data associated with previous authorization actions. The blockchain ID 416 can include data associated with a blockchain specific profile for the user. The blockchain ID 416 can include public or private keys, token IDs, and/or contract addresses.

The third party computing system 420 can include access request data 422, service operations 424, and/or a third party interface 426. The access request data 422 can be descriptive of a template access request to be sent when collecting data. Alternatively and/or additionally, the access request data 422 can be descriptive of the data requesting to be accessed (e.g., medical history data, biometric data, provider-specific data, time-specific data, etc.) and the type of access (e.g., read access, edit access, write access, copy access, delete access, etc.). The service operations 424 can include one or more operations for implementing an operation associated with a computer-implemented service provided by at least one of the third party service provider, a web platform, web application, and/or a web service. The service operations 424 may leverage the personal data for a more user-specific experience. The third party interface 426 can be part of a larger web platform interface.

The blockchain computing system 430 can be a distributed and decentralized computing system. The blockchain computing system 430 can store the personal data 432, the view log 434, and/or the authorization data 436 over the decentralized and decentralized blockchain. The personal data 432, the view log 434, and/or the authorization data 436 may be governed by a smart contract such that viewing may occur in response to a trigger event. Additionally and/or alternatively, the personal data 432, the view log 434, and/or the authorization data 436 may be encrypted via one or more encryption techniques.

Figure 5:
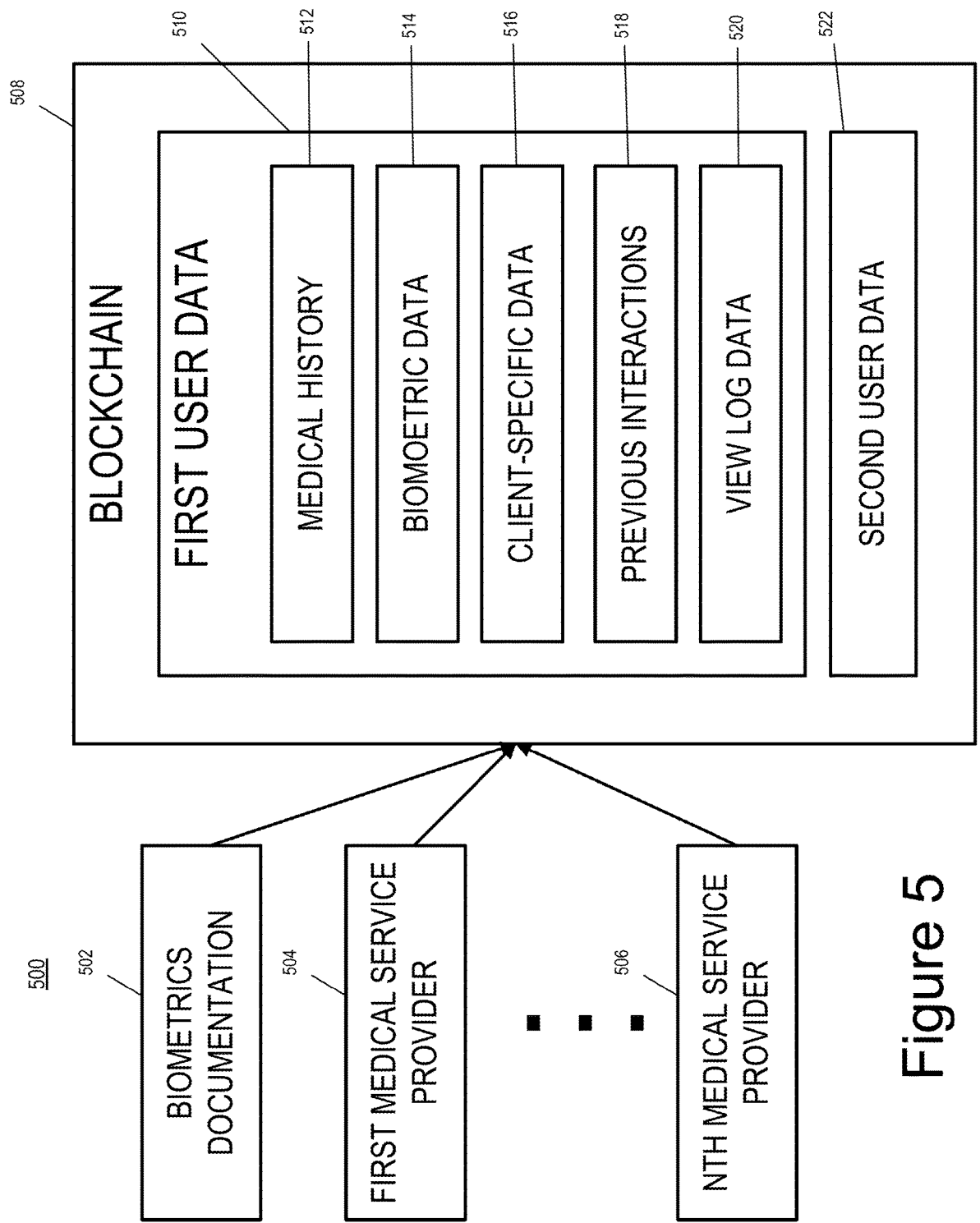
FIG. 5 depicts a block diagram of an example user dataset according to example embodiments of the present disclosure.

FIG. 5 depicts a block diagram of an example user dataset 500 according to example embodiments of the present disclosure. The personal data may be obtained from a plurality of third party computing systems (e.g., one or more biometric entities, one or more medical entities, and/or one or more other entities) over a period of time (e.g., years, months, days, hours, minutes, etc.). For example, a first user data 510 associated with a first user and second user data 522 associated with a second user can be stored on a blockchain 508. The first user data 510 and/or the second user data 522 can be generated based on data provided and/or generated based on user-specific documentation, which can include biometrics documentation data 502, a first medical service provider data 504, and/or an nth medical service provider data 506. The user may be able to choose when and to what extent data is obtained from each particular entity. The permissions may be stored on the blockchain 508.

The first user data 510 can include medical history data 512, biometric data 514, client-specific data 516, previous interaction data, and/or view log data 520. The medical history data 512 can include past medical exams, past surgeries, past treatments, past blood work, past medical visits, and/or other medical context associated with the first user. The medical history data 512 may be obtained and/or generated based on data provided from third party computing systems (e.g., the biometrics documentation data 502 from a biometric entity, a first medical service provider data 504 from a first medical provider, and/or an nth medical service provider data 506 from an nth medical provider). The biometric data 514 can include iris data, facial data, bodily fluid data, and/or fingerprint data associated with the first user. The biometric data 514 may be obtained and/or generated based on data provided from a third party computing system. The client-specific data 516 can include additional client-specific data associated with the first user. The client-specific data 516 may be obtained and/or generated based on interactions with a general interface and/or a specific web platform. The previous interaction data 518 can include previous interactions with one or more web platforms. The view log data 520 may include data descriptive of instances of data generation and/or data viewing.

Example Methods

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can receive an access request from a third party computing system. The access request can be descriptive of a request to access biological data for a particular user. In some implementations, the biological data can be stored on a blockchain. The biological data can be associated with biological characteristics of the particular user. Additionally and/or alternatively, the biological data can include biometric data associated with the particular user. The biometric data can include iris data associated with the particular user. The iris data can be descriptive of one or more identifying features of an iris of the particular user. Alternatively and/or additionally, the biometric data can include face data associated with the particular user. The face data can be descriptive of one or more identifying features of a face of the particular user. In some implementations, the biometric data can include fingerprint data associated with the particular user. The fingerprint data can be descriptive of one or more identifying features of a fingerprint of the particular user.

At 604, the computing system can determine a particular entity associated with the third party computing system. The particular entity can be associated with a web platform. In some implementations, the particular entity may be associated with a medical service provider, an authentication computing system, and/or a government entity. Determining the particular entity can be based on obtaining and processing an internet protocol address, a device yin number, profile information, and/or transmission metadata. The determination may be based on a database of entities associated with particular web IDs.

At 606, the computing system can transmit a notification to a particular user computing system. The particular user computing system can be associated with the particular user. In some implementations, the notification can be descriptive of the access request and the particular entity. The access request can include a timestamp and a particular level of access requested. The levels of access can differ based on the type of entity. For example, a medical service provider may be provided write access and read access, while a non-medical professional may be provided read access without write access. The notification can be provided to a particular user's smartphone, a smart wearable (e.g., a smartwatch or smart glasses), a tablet, and/or another computing device. In some implementations, the notification may include an option to request further information from the third party computing system.

At 608, the computing system can receive user input data from a particular user computing system. The user input data can be descriptive of a user response to the access request. The user input data can be descriptive of approval of the request, denial of the request, and/or a partial approval. In some implementations, the user input data may be descriptive of a request for further information on the particular entity. The user input data can include a selection of an option provided via the user interface of the notification portal. The user input data may be received with a user identifier and/or a device identifier.

In some implementations, the notification generation and transmittal may be replaced and/or complemented by location determination. For example, a location of the particular user can be determined based on one or more mobile devices associated with the particular user. The location data can then be utilized to authenticate the access of the biological data based on the particular entity being a medical service provider associated with the location of the particular user (e.g., a user may be in a hospital and a hospital computer may be requesting access).

At 610, the computing system can determine an access action based on the user input data. The access action can be descriptive of a level of access to be provided to the third party computing system to the biological data on the blockchain. The access action can include a read call without write access. The level of access can include full access, partial access, and/or no access. In some implementations, the access action can be descriptive of a particular subset of the biological data to provide access to the third party to view. The subset can include biometric data, medical history data, and/or other biological data.

In some implementations, the access action can include providing the biological data to the third party computing system. Alternatively and/or additionally, the access action can include providing a subset of the biological data to the third party computing system.

In some implementations, the access action can include accessing a blockchain node based on the access request and identifying blockchain data associated with the particular user. The blockchain data can include the biological data. In some implementations, the blockchain data can include a view log associated with the biological data.

At 612, the computing system can adjust a view log based on the access action. The view log can be descriptive of one or more viewers associated with the biological data. The view log can be stored on the blockchain and may be associated with the particular user and/or the biological data.

In some implementations, the computing system can cause the access action to occur and determine a view time of the access action. Adjusting the viewer log can include logging the view time associated with the access action.

Alternatively and/or additionally, the computing system can determine the particular entity is associated with a medical service provider. In some implementations, the access action can include providing the biological data to the medical service provider.

Figure 7:
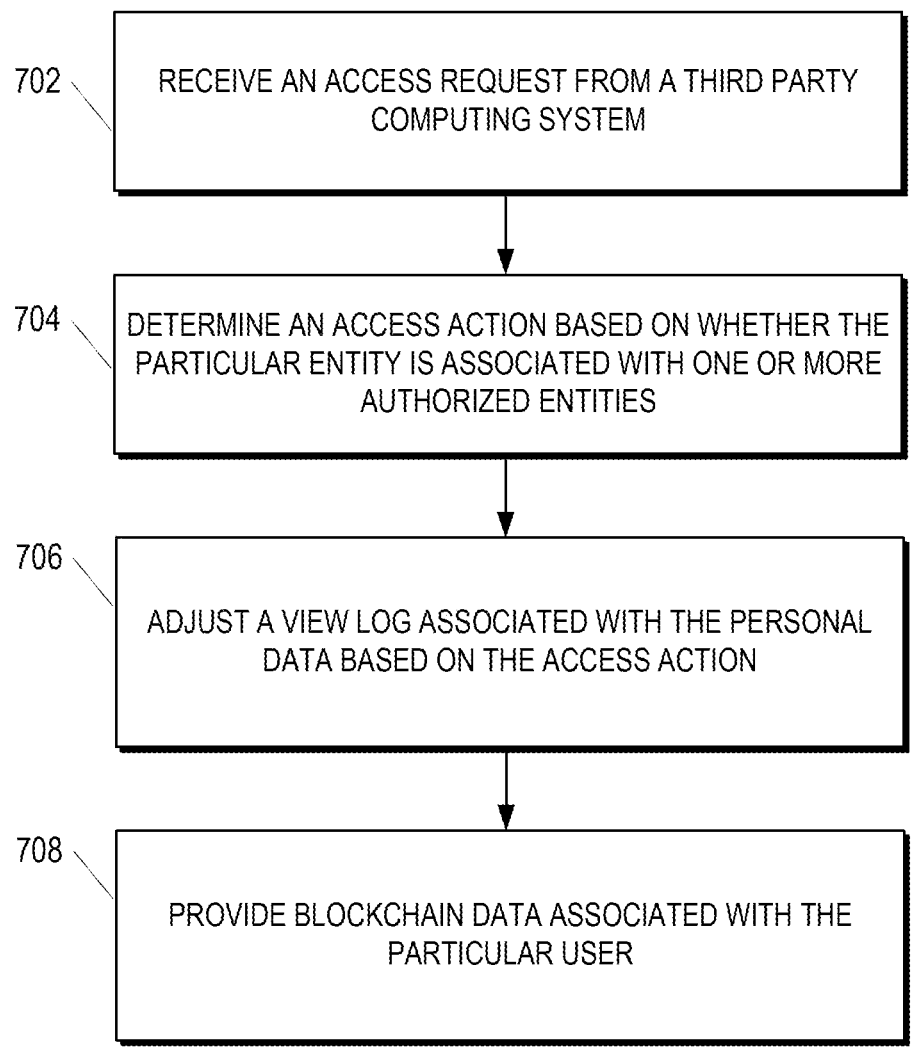
FIG. 7 depicts a flow chart diagram of an example method to perform personalization model access authorization according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can receive an access request from a third party computing system. The access request can be descriptive of a request to access personal data associated with a particular user. In some implementations, the personal data can be stored on a blockchain. The personal data can include biometric data associated with the particular user. Alternatively and/or additionally, the personal data can include other biological data such as medical history data, drug routine, and/or blood type. The biometric data can include iris data, fingerprint data, and/or facial data that can be utilized to verify the identity of the particular user. In some implementations, the personal data can include other user data associated with the identity of the particular user.

In some implementations, the computing system can determine a particular entity associated with the third party computing system. The particular entity can be associated with a third party service provider. The third party service provider can include a medical service provider, a security provider (e.g., a security provider that utilizes fingerprint data to provide secure locks for buildings), and/or an insurance service provider.

At 704, the computing system can determine an access action based on whether the particular entity is associated with one or more authorized entities. The one or more authorized entities can be determined based on one or more user inputs. The one or more authorized entities can be determined based on an authorization list. Alternatively and/or additionally, the one or more authorized entities can be determined based on the type of entity. For example, the particular entity may be determined to be a medical entity, a government entity, a research entity, and/or an insurance entity.

At 706, the computing system can adjust a view log associated with the personal data based on the access action. Adjusting the view log can include adding log data associated with the particular entity and the access request to the view log. The view log can include a plurality of entries associated with a plurality of different accesses provided to a plurality of different third parties. The view log can include the time of access and one or more identifiers associated with the particular third party who accessed the personal data. The one or more identifiers can include internet protocol addresses, web IDs, data associated with a web profile, a blockchain ID, and/or a hash function.

At 708, the computing system can provide blockchain data associated with the particular user. The blockchain data can include the personal data. For example, the blockchain data can include encrypted personal data and may include information descriptive of times and dates for different medical exams for the particular user.

Figure 8:
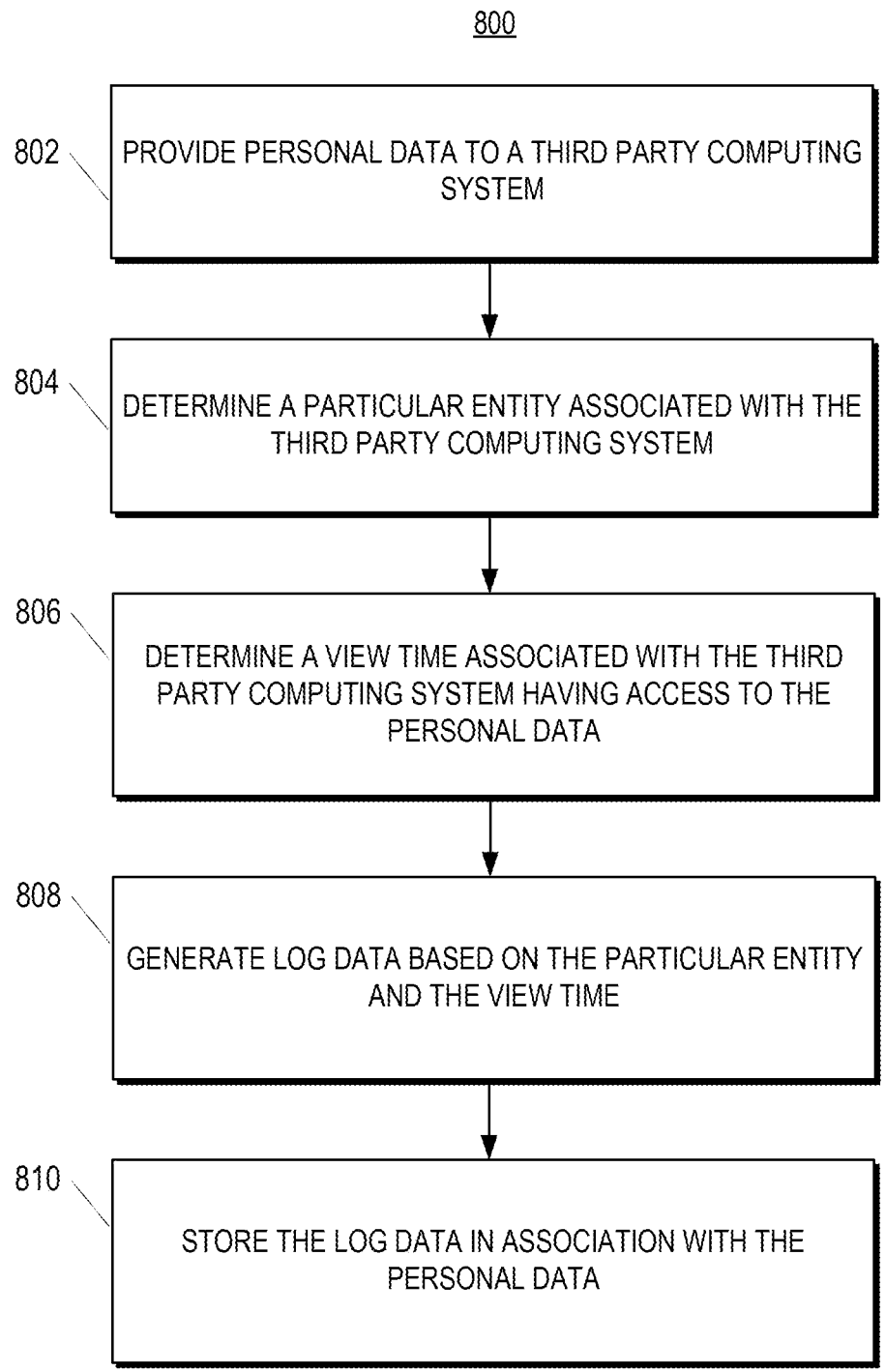
FIG. 8 depicts a flow chart diagram of an example method to perform access authorization according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can provide personal data to a third party computing system. The personal data can be associated with a particular user. In some implementations, the personal data can be stored on a blockchain. The personal data can include biological data. The biological data can include medical history data, biometric data, and/or general identity-specific data (e.g., blood type and/or birth information).

At 804, the computing system can determine a particular entity associated with the third party computing system. The particular entity can be associated with one or more web identifiers. The particular entity can include a hospital, an employer, an insurance company, a security company, a dentist, a general practitioner, a medical specialist, and/or a blood donation company.

At 806, the computing system can determine a view time associated with the third party computing system having access to the personal data. The view time can be determined by accessing an internal clock of a computing system. The view time may be based on the time of request and/or may be based on the time of the access occurring.

At 808, the computing system can generate log data based on the particular entity and the view time. The log time can be descriptive of the one or more web identifiers and the view time. The log data may include metadata associated with the type of access, the view duration of the access, and/or the level of access provided to the particular third party computing system.

At 810, the computing system can store the log data in association with the personal data. The log data can be stored with previous log data of a view log. The view log can store data associated with the interactions with the personal data, which can include a read call, a write call, and/or download call.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the computing system comprising:
one or more processors; and
one or more non-transitory computer-readable media that collectively store instructions that, when executed by the one or more processors, cause the computing system to perform operations, the operations comprising:
receiving an access request from a third party computing system, wherein the access request is descriptive of a request to access biological data for a particular user, wherein the biological data is stored on a blockchain, and wherein the biological data is associated with biological characteristics of the particular user;
determining a particular entity associated with the third party computing system;
transmitting a notification to a particular user computing system, wherein the particular user computing system is associated with the particular user, wherein the notification is descriptive of the access request and the particular entity;
receiving user input data from a particular user computing system, wherein the user input data is descriptive of a user response to the access request;
determining an access action based on the user input data, wherein the access action is descriptive of a level of access to be provided to the third party computing system to the biological data on the blockchain;
adjusting a view log based on the access action, wherein the view log is descriptive of one or more viewers associated with the biological data, wherein adjusting the view log comprises updating the blockchain to include log data comprising a type of access and the particular entity and updating an authorization list on the blockchain based on the particular entity and the access action; and
facilitating the type of access to the biological data by the third party computing system based on the authorization list stored on the blockchain, wherein the type of access comprises at least one of: view access, write access, copy access, edit access, or delete access.

2. The computing system of claim 1, wherein the operations further comprise:
causing the access action to occur;
determining a view time of the access action; and
wherein adjusting the viewer log comprises logging the view time associated with the access action.

3. The computing system of claim 1, wherein the operations further comprise:
determining the particular entity is associated with a medical service provider; and
wherein the access action comprises providing the biological data to the medical service provider.

4. The computing system of claim 1, wherein the access action comprises a read call without write access.

5. The computing system of claim 1, wherein the access action comprises at least one of:
providing the biological data to the third party computing system; or
providing a subset of the biological data to the third party computing system.

6. The computing system of claim 1, wherein the access action comprises:

accessing a blockchain node based on the access request; and
identifying blockchain data associated with the particular user.

7. The computing system of claim 1, wherein the biological data comprises biometric data associated with the particular user.

8. The computing system of claim 7, wherein the biometric data comprises iris data associated with the particular user, wherein the iris data is descriptive of one or more identifying features of an iris of the particular user.

9. The computing system of claim 7, wherein the biometric data comprises face data associated with the particular user, wherein the face data is descriptive of one or more identifying features of a face of the particular user.

10. The computing system of claim 7, wherein the biometric data comprises fingerprint data associated with the particular user, wherein the fingerprint data is descriptive of one or more identifying features of a fingerprint of the particular user.

11. The computing system of claim 1, wherein the particular entity is associated with a web platform.

12. A computer-implemented method, the method comprising:
receiving, by a computing system comprising one or more processors, an access request from a third party computing system, wherein the access request is descriptive of a request to access personal data associated with a particular user, wherein the personal data is stored on a blockchain, and wherein the personal data comprises biometric data associated with the particular user;
determining, by the computing system, a particular entity associated with the third party computing system, wherein the particular entity is associated with a third party service provider;
determining one or more authorized entities associated with the particular user based on one or more user inputs, wherein the one or more authorized entities are determined based on:
transmitting a notification to a particular user computing system associated with the particular user, wherein the notification is descriptive of the access request and the particular entity; and
receiving user input data from a particular user computing system, wherein the user input data is descriptive of a user response to the access request;
determining, by the computing system, an access action based on whether the particular entity is associated with the one or more authorized entities, wherein the one or more authorized entities are determined based on one or more user inputs;
adjusting, by the computing system, a view log associated with the personal data based on the access action, wherein adjusting the view log comprises adding log data associated with the particular entity and the access request to the view log, wherein adjusting the view log comprises updating the blockchain to include log data comprising a type of access and the particular entity and updating an authorization list on the blockchain based on the particular entity and the access action, wherein the type of access comprises at least one of: view access, write access, copy access, edit access, or delete access; and
providing, by the computing system, blockchain data associated with the particular user based on access action stored on the authorization list on the blockchain, wherein the blockchain data comprises the personal data.

13. The method of claim 12, wherein the biometric data is descriptive of one or more identifying features associated with the particular user.

14. The method of claim 12, wherein the view log comprises a plurality of entries, wherein each entry comprises identification data associated with a viewer of the personal data.

15. The method of claim 12, further comprising:
determining, by the computing system, the particular entity is associated with a medical service provider; and wherein the access action comprises providing write access to the medical service provider; and
determining, by the computing system, to transmit the notification based on the particular entity being associated with a medical service provider.

16. The method of claim 15, further comprising:
obtaining, by the computing system, additional personal data from the medical service provider; and
adding, by the computing system, the additional personal data to the blockchain.

17. One or more non-transitory computer-readable media that collectively store instructions that, when executed by one or more computing devices, cause the one or more computing devices to perform operations, the operations comprising:
receiving an access request from a third party computing system to provide personal data to the third party computing system, wherein the personal data is associated with a particular user, wherein the personal data is stored on a blockchain, wherein the personal data comprises biological data;
determining a particular entity associated with the third party computing system, wherein the particular entity is associated with one or more web identifiers;
determining to provide a notification to a particular user computing system based on processing entity data descriptive of the particular entity with an authorization block;
transmitting the notification to the particular user computing system, wherein the particular user computing system is associated with the particular user, wherein the notification is descriptive of the access request and the particular entity;
receiving user input data from a particular user computing system, wherein the user input data is descriptive of a user response to the access request;
determining an access action based on the user input data, wherein the access action is descriptive of a level of access to be provided to the third party computing system to the biological data on the blockchain;
determining a view time associated with the third party computing system having access to the personal data;
generating log data based on the particular entity, the level of access, and the view time, wherein the log data is descriptive of the one or more web identifiers and the view time;
storing, on the blockchain, the log data in association with the personal data, wherein storing the log data comprises updating the blockchain to include log data comprising a type of access and the particular entity and updating an authorization list on the blockchain based on the particular entity and the access action; and
facilitating the type of access to the biological data by the third party computing system based on the authorization list stored on the blockchain, wherein the type of access comprises at least one of: view access, write access, copy access, edit access, or delete access.

18. The one or more non-transitory computer-readable media of claim 17, wherein the personal data comprises medical history data associated with the particular user, wherein the medical history data is descriptive one or more previous medical statuses for the particular user.

19. The one or more non-transitory computer-readable media of claim 17, wherein the operations further comprise:
processing the access request and the entity data descriptive of the particular entity with a machine-learned model of an authorization block, wherein the machine-learned model was trained on previous authorization interactions by the particular user; and
determining to provide the notification based on an output of the machine-learned model of the authorization block.

20. The one or more non-transitory computer-readable media of claim 17, wherein the one or more web identifiers comprise at least one of an internet protocol address, web profile information, a blockchain key, or a computing device identifier.

* * * * *